United States Patent
Kobayashi et al.

(10) Patent No.: US 7,018,605 B2
(45) Date of Patent: Mar. 28, 2006

(54) SULFIDATION REACTION CONTROL METHOD

(75) Inventors: Hiroshi Kobayashi, Niihama (JP); Yoshitomo Ozaki, Niihama (JP); Masaki Imamura, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 437 days.

(21) Appl. No.: 10/372,635

(22) Filed: Feb. 24, 2003

(65) Prior Publication Data

US 2003/0173308 A1 Sep. 18, 2003

(30) Foreign Application Priority Data

Feb. 25, 2002 (JP) .............................. 2002-048017

(51) Int. Cl.
- C01B 17/20 (2006.01)
- C01G 9/08 (2006.01)
- C22B 3/44 (2006.01)

(52) U.S. Cl. .................. 423/561.1; 423/101; 423/140; 423/141; 423/566.1; 423/659; 423/DIG. 2

(58) Field of Classification Search ............ 423/566.1, 423/101, DIG. 2, 140, 141, 561.1, 102, 142, 423/659

See application file for complete search history.

(56) References Cited

U.S. PATENT DOCUMENTS

| | | | | |
|---|---|---|---|---|
| 2,722,480 A | * | 11/1955 | Roy | 423/142 |
| 2,755,172 A | * | 7/1956 | McGauley et al. | 423/43 |
| 2,915,388 A | * | 12/1959 | Lyle et al. | 75/374 |
| 3,218,161 A | * | 11/1965 | Kunda et al. | 423/22 |
| 3,740,331 A | * | 6/1973 | Anderson et al. | 210/726 |
| 3,809,549 A | * | 5/1974 | Opratko et al. | 423/140 |
| 4,073,860 A | * | 2/1978 | Huggins et al. | 423/140 |
| 4,278,539 A | * | 7/1981 | Santhanam et al. | 210/724 |
| 4,405,570 A | * | 9/1983 | Van der Meulen et al. | 423/43 |

FOREIGN PATENT DOCUMENTS

| | | | |
|---|---|---|---|
| CA | 1035152 | * | 7/1978 |
| EP | 0 547 744 | * | 6/1993 |
| GB | 1 244 194 | * | 8/1971 |
| JP | 47-2555 | | 2/1972 |
| JP | 63-45130 | * | 2/1988 |
| JP | 06-116660 | | 4/1994 |
| JP | 2002-121624 | * | 4/2002 |

OTHER PUBLICATIONS

English translation of JP 63-45130, published Feb. 26, 1988.*

* cited by examiner

*Primary Examiner*—Tom Dunn
*Assistant Examiner*—Ardith E. Hertzog
(74) *Attorney, Agent, or Firm*—Katten Muchin Rosenman LLP

(57) ABSTRACT

A method of sulfidation removal of zinc using hydrogen sulfide is provided, desirably at a temperature at 60° C. or lower, wherein in a container that is pressurized at 0.1 MPa or less with respect to atmospheric pressure, by making the pH of the solution 1.5 to 4.0, and the concentration of hydrogen sulfide in gas 2 volume % or greater in equilibrium with the hydrogen sulfide dissolved in the solution, the zinc in solution is removed by sulfidation to 1 mg/liter or less.

8 Claims, 3 Drawing Sheets

SULFIDATION REACTION CONTROL METHOD

BACKGROUND OF THE INVENTION

1. Field of the Invention

This invention relates to a method of controlling a sulfidation reaction of a heavy metal such as zinc in a solution by using hydrogen sulfide, and particularly to a method of sulfidation reaction to selectively remove zinc from a solution.

2. Description of the Related Art

In the hydrometallurgy method or waste water treatment method of metals, the method of fixation of the heavy metal component in a solution by a sulfidation reaction using hydrogen sulfide has been widely used as the main fixation method. For examples technology to recover sulfides of nickel and cobalt from a solution containing nickel and cobalt is disclosed in JP Patent publications of Tokukai Sho 47-2555 and Tokukai Hei 6-116660. Incidentally, there is no description on movement of zinc in the publications.

It is said that control of this sulfidation reaction is generally difficult. Oxidation-reduction potential (ORP) and pH must be controlled to obtain proper sulfidation reaction. This sulfidation reaction is a reaction that generates fine sulfide slime, so the surface of the controller such as an electrode is covered by the reaction product and it becomes difficult to accurately measure the oxidation-reduction potential (ORP) or pH, or it becomes difficult to stably control the amount of flow of hydrogen sulfide due to blockage of the intake pipe for hydrogen sulfide gas which is injected to control the ORP and pH.

In order to solve the problem of controlling the reaction as described above, measures are taken such as industrially performing a sampling of the reaction solution and measuring the ORP or pH using an external system, or by blowing a constant flow of inert gas such as nitrogen gas into the piping. However, in the case of the former, a problem occurs in that a time lag occurs due to the time required for taking the sampling, so this it is not suitable when performing fine reaction control; and in the case of the latter, a problem occurs in that the reaction cost increases due to constantly having to blow in the inert gas.

Also, in order to adopt these methods, there is a problem in that sampling equipment, or equipment for blowing the inert gas is necessary.

On the other hand, the fixing method by way of sulfidation reaction is also used for selectively removing an impurity of zinc from the solution containing cobalt, nickel, ion, manganese and othser metals. A zinc removal step using hydrogen sulfide gas is disclosed in JP Patent publication Tokukai Sho 63-45130.

When removing zinc, specifically zinc sulfide, from such a solution, since the acidity limitation value for precipitating MnS, CoS, NiS and FeS from the respective solutions is substantially different from that for ZnS (for example, HCl 0.02N for ZnS while HCl 0.001N for CoS and NiS), it is expected that ZnS is first easily separated in the lower pH range. However, ZnS is inclined to induce co-precipitation of NiS and FeS, so that it is difficult to selectively separate only zinc from the reaction solution. Therefore, JP Patent publication Tokukai Sho 63-45130 discloses a method for zinc removal where e.g. calcium carbonate is added to the solution to neutralize the acid produced through reaction to keep the pH in the solution to a proper value for precipitation of zinc sulfide.

However, in this method, since chemicals are added for pH control during injection of hydrogen sulfide gas, reaction between the pH control agent and nickel and cobalt is locally caused to produce hydroxides. This is a problem because of loss in object metals such as nickel in addition to the problems as mentioned above.

Due to the problems mentioned above, there was a need to develop a sulfidation reaction control method that makes it possible to easily perform fine reaction control.

SUMMARY OF THE INVENTION

In order to solve the aforementioned problems, it is the object of this invention to provide a method of controlling the sulfidation reaction of heavy metal in a solution using hydrogen sulfide, and that makes simple and fine control of this reaction possible.

In order to solve the aforementioned problems, the method of this invention is a method of controlling the sulfidation reaction of a heavy metal in a solution using hydrogen sulfide by adjusting the concentration of hydrogen sulfide dissolved in the solution and the concentration of the hydrogen sulfide in gas that equilibrates it.

It is another object of this invention to provide a method of controlling sulfidation reaction to selectively remove zinc from a solution.

This invention is characterized by supplying hydrogen sulfide in gas to a container that is pressurized at 0.1 MPa or less with respect to atmospheric pressure, and controlling sulfidation of the heavy metal by adjusting the concentration of the hydrogen sulfide in gas that equilibrates the hydrogen sulfide dissolved in the solution.

For example, in a method of sulfidation removal of zinc using hydrogen sulfide, under the above conditions, by making the pH of the solution 15 to 4.0, and the concentration of hydrogen sulfide in gas 2 volume % or greater, and preferably, 5 volume %, the zinc in solution is removed by sulfidation to 1 mg/liter or less.

DESCRIPTION OF THE PREFERRED EMBODIMENTS

Figure 1:
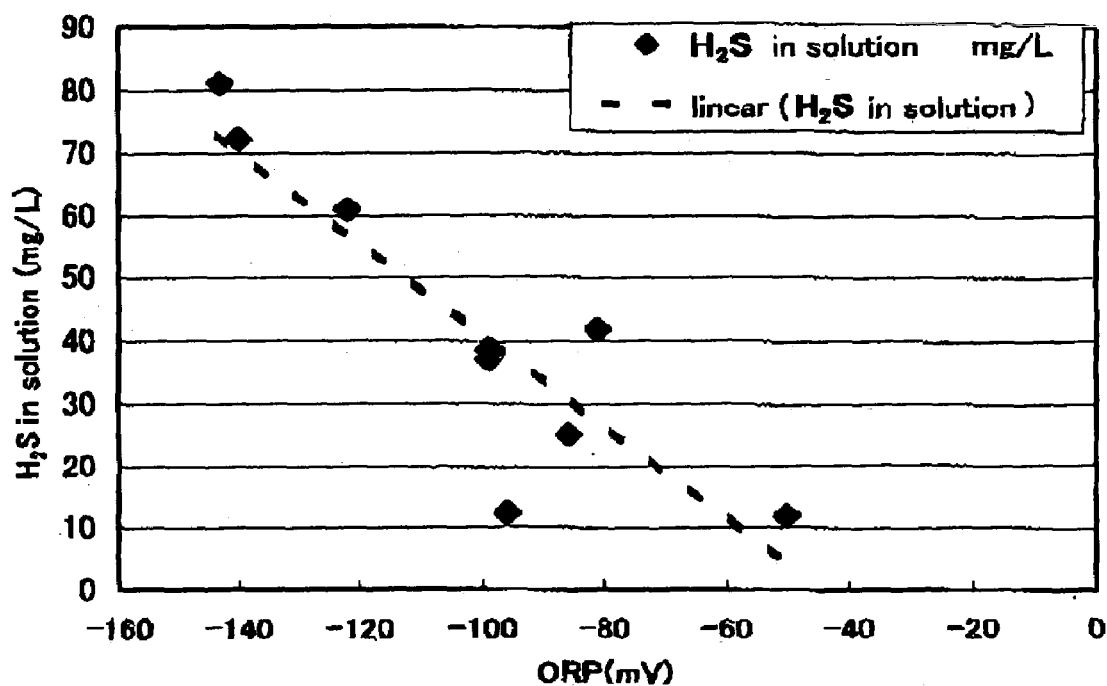
FIG. 1 is a graph showing the relationship between the concentration of hydrogen sulfide in the solution and the ORP (vs Ag/AgCl).

The method of this invention is a method of controlling the sulfidation reaction by adjusting the amount of hydrogen sulfide dissolved in the solution through adjusting the concentration of the equilibrating hydrogen sulfide in gas in the reaction vessel, and does not require taking measures such as performing complicated sampling or preventing the blockage of the piping using inert gas, and can provide a series of very simple hydrometallugical processes.

Particularly, when using hydrogen sulfide for zinc removal, pH of the solution is in the range of 1-5 to 4.0, the concentration of hydrogen sulfide in the gas phase is 2 vol.

% or more, desirably 5 vol. % or more, so as to remove zinc in the solution to 1 mg/l or less.

In addition, when removing Zn ion selectively with respective to nickel ion and cobalt ion in the solution through sulfidation reaction, the reaction temperature is kept at 60° C. or lower for higher selectivity while controlling the concentration of hydrogen sulfide in the gas phase in equilibrium with the solution in the reaction vessel.

This invention is based on the control, specifically a linear relationship between the concentration of hydrogen sulfide in gas and the ORP of the reaction solution in a sulfidation reaction that uses hydrogen sulfide and that is performed at a pressure of 0.1 MPa or less.

This relationship depends on having a linear relationship between the concentration of hydrogen sulfide dissolved in the reaction solution and the concentration of the hydrogen sulfide in gas that equilibrates it, and similarly depends also on having a linear relationship between the concentration of the hydrogen sulfide dissolved in the reaction solution and the ORP of the reaction solution.

Therefore, the sulfidation reaction of this invention can be controlled by the ORP of the reaction, so by adjusting the concentration of the hydrogen sulfide in gas, it is possible to control the ORP and to control the sulfidation reaction in the solution.

To be more specific, in the case of a process for removing zinc from a nickel solution using a sulfidation reaction, for example, it is possible to remove the zinc by controlling the pH of the nickel solution containing zinc as an impurity such that it is between 1.5 and 4.0, and by controlling the ORP such that it is −100 to −250 (mV vs. Ag/AgCl) by blowing in hydrogen sulfide. When doing this, if the pH is less than 1.5. the concentration of the sulfur ions in the solution decreases and it becomes difficult for the sulfidation reaction to advance; and if the pH is greater than 4.0, there is a possibility that heavy metal hydroxides will precipitate out, which is not preferred.

On the other hand, when reaction is conducted to recover nickel from the solution of heavy metal after zinc is removed, the pH of nickel solution is adjusted in the range of 0.5 to 3.0, and by injecting hydrogen sulfide in the gas phase to control ORP in the range of −130 to −300 mV vs. Ag/AgCl.

Therefore, the amount of hydrogen sulfide in the solution is controlled such that the ORP of the solution is within the range described above, however, it is possible to set the amount of hydrogen sulfide in the solution by the partial pressure of the hydrogen sulfide in gas.

The amount of hydrogen sulfide dissolved in the solution is set by the partial pressure of the equilibrating hydrogen sulfide in gas phase, so with this method it is sufficient to blow hydrogen sulfide into the gas phase without having to use a pipe to blow hydrogen sulfide into the solution. Therefore, it is possible to solve the problem of the hydrogen sulfide intake pipe in the solution becoming blocked by the reaction products.

Meanwhile, when first removing zinc through selective sulfidation for fixing from the solution containing metallic ions such as nickel and cobalt, the co-sulfidation of nickel and cobalt often occurs.

Specifically, since the reaction temperature affects the reaction rate of sulfidation, if the reaction is conducted at a higher temperature, the sulfidation reaction is promoted. In the series where the same sulfidation reaction occurs, the reaction is promoted in both of the target element, e.g. zinc, to be sulfided, and the elements, e.g. nickel and cobalt, which are intended to be remained in the solution, and they are precipitated together, and therefore selectivity is lost between them. And, as the reaction is further advanced, the precipitated sulfides are resolved by the sulfuric acid produced by the sulfidation reaction, which worsens the rate of sulfidation fixing. The rate of this reaction is relatively slow in the lower temperature, and so it is possible to achieve the separation of zinc by conducting the reaction at a temperature of 60° C. or lower, maintaining selectivity of elements to be sulfated.

It is expected that even with reaction at a higher temperature, the reaction rate is reduced by lowering the addition speed of sulfidation agent to achieve the selective separation. However, with this adjustment of addition rate, the reaction rate required in the industry is hardly obtained, and the judgement of final separation point on selective sulfidation is difficult in practicing this method.

Next, embodiments of the invention will be explained. The scope of this invention is not limited by these embodiments. In these embodiments, examples of a zinc removal reaction using sulfidation will be explained. Similar control can be applied to the sulfidation reaction of heavy metals such as cobalt, nickel iron, manganese etc., except for particular selective zinc-removal reaction.

EXAMPLE 1

A sulfate solution containing approximately 3 g/liter nickel was used as the initial solution for the zinc removal reaction. The zinc concentration in this solution was 60 mg/liter. Next, two 30-liter reaction vessels were joined together, and the zinc removal reaction by sulfidation was performed. The aforementioned initial reaction solution was added continuously at a rate of 60 liters/hour, the pressure in the vessels was maintained at 0.02 MPa, and the temperature was maintained at 40 to 50° C. Hydrogen sulfide was blown into the gas phase while stirring the solution to cause the reaction to take place. Samples 1 to 7 were collected and analyzed.

The continuous reaction time was 14 hours, the initial reaction pH was 3.67 and the initial ORP was 266 mV.

The test results are shown in Table 1.

TABLE 1

|  | Zn(mg/l) | pH | ORP(mV) vs Ag/AgCl |
| --- | --- | --- | --- |
| Sample 1 | 20 | 3.32 | −50 |
| Sample 2 | 5 | 3.26 | −80 |
| Sample 3 | 2 | 3.10 | −96 |
| Sample 4 | <1 | 3.38 | −105 |
| Sample 5 | <1 | 3.26 | −106 |
| Sample 6 | <1 | 3.36 | −121 |
| Sample 7 | <1 | 328 | −147 |

As shown in Table 1, the zinc removal reaction depends on the ORP of the reaction solution, and when the ORP is about −100 (mV vs. A/AgCl) or less, it can be seen that it is possible to remove almost all of the Zinc, to less than 1 mg/liter.

Next, in order to make the ORP −100 mV or less, the relationship between the ORP and amount of hydrogen sulfide in solution was investigated. The results are shown in FIG. 1.

As shown in FIG. 1, the ORP of the solution has a linear relationship with the amount of hydrogen sulfide in the solution, so by controlling the amount of hydrogen sulfide in the solution, it is possible to control the ORP of the reaction. In the case of this examples in order to lower the ORP to −100 mV or less, which is the range where it is possible to remove nearly all the zinc, it is necessary to dissolve approximately 40 mg/liter of hydrogen sulfide into the reaction solution.

Next, the partial pressure of the equilibrating hydrogen sulfide in gas for obtaining an amount of approximately 40 mg/liter of hydrogen sulfide dissolved in solution was investigated. The results are shown in FIG. 2.

Figure 2:
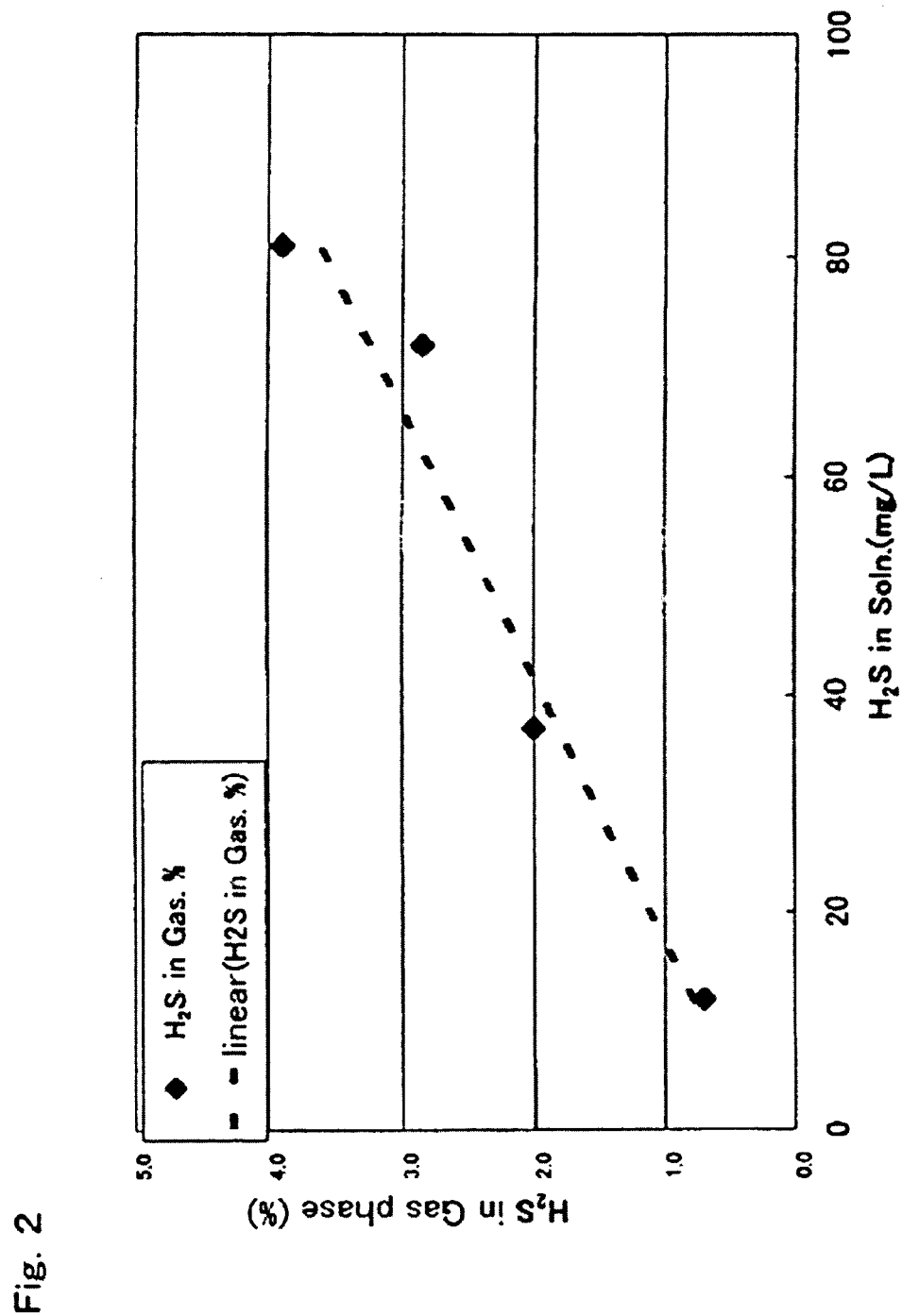
FIG. 2 is a graph showing the relationship between the concentration of hydrogen sulfide in gas and the amount of hydrogen sulfide in the solution.

As shown in FIG. 2, there is a linear relationship between the amount of hydrogen sulfide dissolved in the reaction solution and the concentration of the equilibrating hydrogen sulfide in the gas phase. In this example, as shown in FIG. 2, the concentration of the hydrogen sulfide in the gas phase necessary for advancing the reaction is approximately 2 volume %. Also, when the concentration of hydrogen sulfide in the gas phase reaches 4 volume %, the concentration of the hydrogen sulfide in solution becomes 80 mg/liter, and the ORP in this case becomes −150 mV as shown in FIG. 1.

Therefore, it is possible to control the sulfidation reaction by adjusting the concentration of hydrogen sulfide in the gas phase that equilibrates the reaction solution.

To be more specific, by making the concentration of hydrogen sulfide in the gas phase 2 volume % or more, it is possible to make the concentration of dissolved hydrogen sulfide in the solution 40 mg/liter or more. Also, by making the concentration of dissolved hydrogen sulfide in the solution 40 mg/liter or more, it becomes possible to make the ORP −100 mV or less, and thus it is possible to lower the concentration of Zinc in the solution to 1 mg/liter or less.

Moreover, as expected, through these tests, blockage of the hydrogen sulfide intake pipe was no longer observed.

EXAMPLE 2

A sulfate solution containing approximately 3 g/liter nickel was used as the initial solution for the zinc removal reaction. The zinc concentration in this solution was 80 mg/liter, and adjustment was made to 2.50 of pH and −100 to −200 mV of ORP. A pressurized reaction vessel of 5 m$^3$ was used to perform the zinc removal reaction by sulfidation on this solution.

The nickel reaction solution was added continuously at a rate of about 250 liter/hour so as to obtain the residence time of 20 minutes. The pressure in the vessel was maintained at 0.05 Mpa, and while the solution was stirred, hydrogen sulfide gas was injected into the gas phase at a rate of addition of 0.05 m$^3$ per m$^3$ of the solution (0.75 m$^3$/hour).

The continuous reaction time was 1 hour, and the temperature was kept two levels, 60° C. and 80° C. The test results are shown in FIG. 3.

Figure 3:
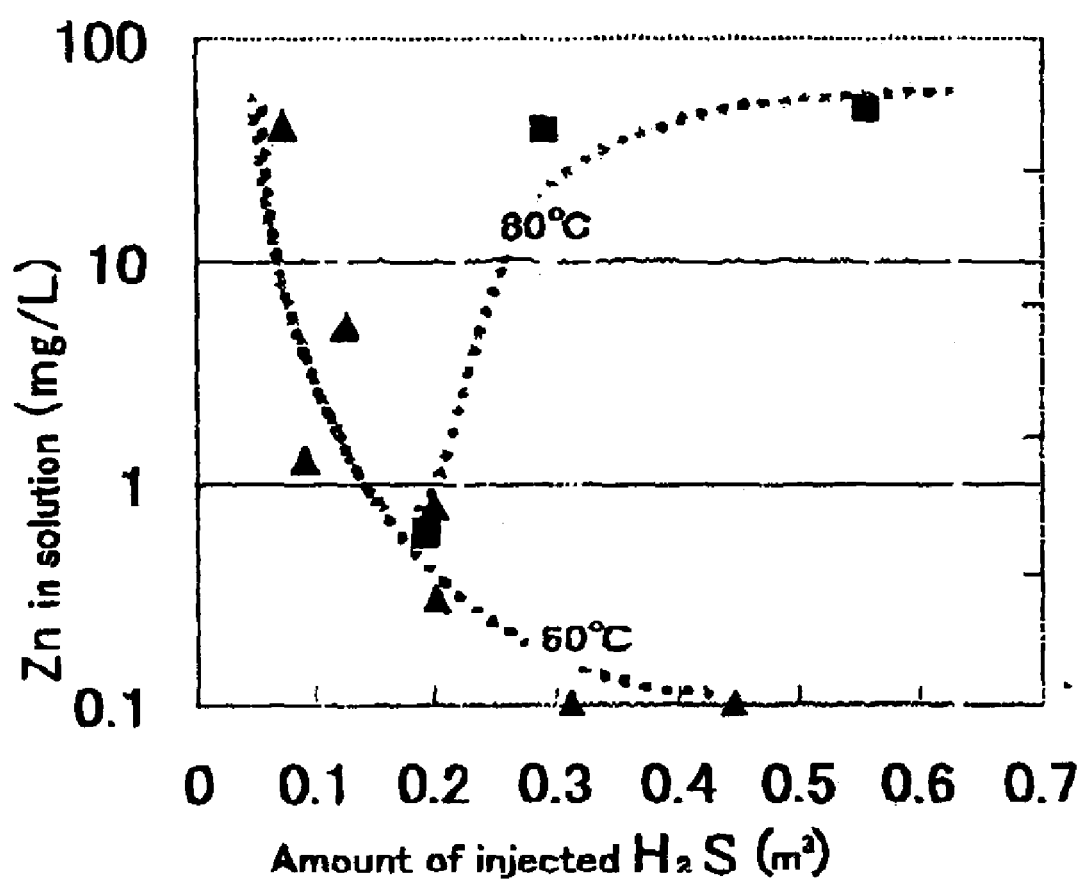
FIG. 3 is a graph showing the relationship between the zinc concentration in solution and the amount (accumulation) of hydrogen sulfide gas blown into gas at the reaction temperature of 60° C. and 80° C.

As shown in FIG. 3, in the reaction at 60° C., zinc was precipitated and removed corresponding to the injection amount of hydrogen sulfide. On the other hand, in the reaction at 80° C., zinc was once reduced from the initial concentration of 80 mg/liter, and then the production of acid due to excessive sulfidation of nickel coexisting with zinc caused resolution of precipitated zinc, and therefore selectivity of sulfidation reaction was lost.

The composition of precipitation after reaction was analized, and the result is shown in Table 2.

TABLE 2

| Reaction temperature | (%) | | | |
|---|---|---|---|---|
| | Ni | Co | Zn | S |
| 60° C. | 2.1 | 0.9 | 33.3 | 58.7 |
| 80° C. | 9.7 | 1.6 | 37.8 | 43.9 |

As shown in Table 2, during the reaction at 80° C., the co-precipitation of nickel and cobalt is apparently increased in amount, and so selectivity is lost. Incidentally, the concentration of sulfur is larger than the stoichiometric composition because the hydrogen sulfide is brought into contact with and oxidized by oxygen in the vessel, and sulfur produced is contained in a great amount.

As was explained above, with this invention, by adjusting the concentration of hydrogen sulfide in gas and controlling the concentration of hydrogen sulfide dissolved in solution and the ORP of the solution, it becomes possible to easily control the sulfidation reaction of a heavy metal such as zinc. Particularly, selective sulfidation of zinc is possible and after previous removal of zinc by the present invention, recovery of heavy metals such as nickel and cobalt is possible as sulfides, so the cost of process is largely reduced, which is very effective in the insudtry.

What is claimed is:

1. A method of controlling a sulfidation reaction of a heavy metal in solution, the method comprising the steps of:
   supplying hydrogen sulfide in a gas phase in a vessel containing the solution, the vessel being pressurized up to 0.1 MPa with respect to atmospheric pressure, and
   adjusting a concentration of the hydrogen sulfide in the gas phase to be in equilibrium with a concentration of the hydrogen sulfide dissolved in solution, so as to control sulfidation of the heavy metal.

2. The method of claim 1, wherein the concentration of the hydrogen sulfide in the gas phase is at least 2 volume %, and the pH of the solution is controlled between 1.5 to 4.0, whereby zinc dissolved in the solution is removed through sulfidation.

3. The method of claim 2, wherein the sulfidation reaction is conducted at a temperature up to 60° C., whereby zinc in the solution is selectively removed with respect to any nickel ion and cobalt ion in the solution through sulfidation.

4. The method of claim 2, wherein the sulfidation reaction is conducted at a temperature up to 60° C., whereby zinc in the solution is selectively removed through sulfidation.

5. A method of controlling a sulfidation reaction of a heavy metal in solution, the method comprising the steps of:
   pressuring a vessel containing the solution up to 0.1 MPa;
   supplying hydrogen sulfide in a gas phase into a space of the vessel, the space being disposed above the solution, and
   adjusting the concentration of the hydrogen sulfide in the gas phase in the space to be in equilibrium with a concentration of the hydrogen sulfide dissolved in solution, so as to control sulfidation of the heavy metal.

6. The method of claim 5, wherein the concentration of the hydrogen sulfide in the gas phase is at least 2 volume %, and the pH of the solution is controlled between 1.5 to 4.0, whereby zinc dissolved in the solution is removed through sulfidation.

7. The method of claim 6, wherein the sulfidation reaction is conducted at a temperature up to 60° C., whereby zinc in the solution is selectively removed with respect to any nickel ion and cobalt ion in the solution through sulfidation.

8. The method of claim 6, wherein the sulfidation reaction is conducted at a temperature up to 60° C., whereby zinc in the solution is selectively removed through sulfidation.

* * * * *